Feb. 28, 1928.

R. G. LEDIG

ELECTRIC HEATER

Filed Sept. 10, 1925

INVENTOR:
Richard G. Ledig.
BY
ATTORNEYS

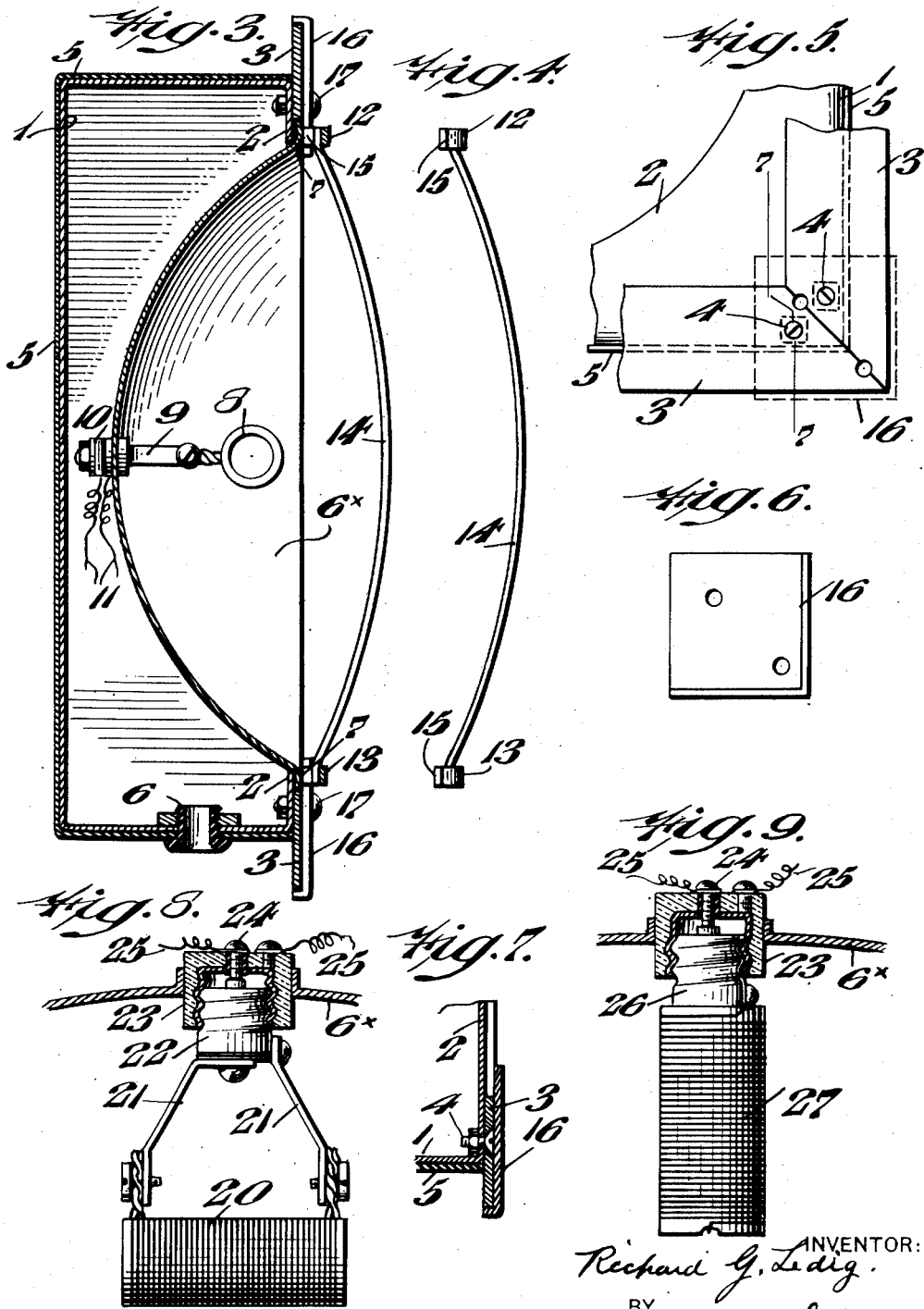

Patented Feb. 28, 1928.

1,660,928

UNITED STATES PATENT OFFICE.

RICHARD G. LEDIG, OF PHILADELPHIA, PENNSYLVANIA, ASSIGNOR TO A. MECKY CO., OF PHILADELPHIA, PENNSYLVANIA, A CORPORATION OF PENNSYLVANIA.

ELECTRIC HEATER.

Application filed September 10, 1925. Serial No. 55,452.

This invention, generally stated, relates to electric-heaters of the reflector type which has a reflecting surface of parabolic contour in which the heating element is centered. More specifically, the invention consists of a heater of the character above stated which is of a type built in and made permanent with the wall of a room to be heated.

The leading object of the present invention may be said to reside in the provision of an electric heater of the type under consideration in which the heating element is protected by a grille which grille is so arranged, connected and constructed as to be readily detached from the heater supporting structure so that persons unskilled in electrical heater construction may in a few moments time readily remove the grille to obtain access to the heating element for replacement or other purposes as occasion may arise.

A further object of the present invention resides in the provision of general details of construction and arrangement and combination of parts for attaining the results sought by the leading object.

Other and further objects of the present invention reside in the provision of a novel construction of parts whereby the heating element may be easily and expeditiously removed from the heater.

Still other objects not at this time more particularly pointed out will appear hereinafter.

The invention consists of the novel construction hereinafter described and finally claimed.

The nature, characteristic features and scope of the invention will be more fully understood from the following description taken in connection with the accompanying drawings forming part hereof, and in which:

Fig. 3, is a view in vertical section taken upon the line 3—3 of Fig. 1.

Fig. 4, is an edge view of the grille shown in the foregoing figures.

Fig. 5, is a fragmentary view in elevation of one corner of the supporting structure of the electric heater with its complemental corner plate removed.

Fig. 6, is a view of one of the corner plates shown in Fig. 1.

Fig. 7, is a view in vertical section taken upon the line 7—7 of Fig. 5.

Fig. 8, is a fragmentary view illustrating the manner of attaching a horizontally disposed heating element with respect to a screw socket; and Fig. 9, is a similar view illustrating a slightly modified form of heating element.

For the purpose of illustrating my invention I have shown in the accompanying drawings forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figure 1:
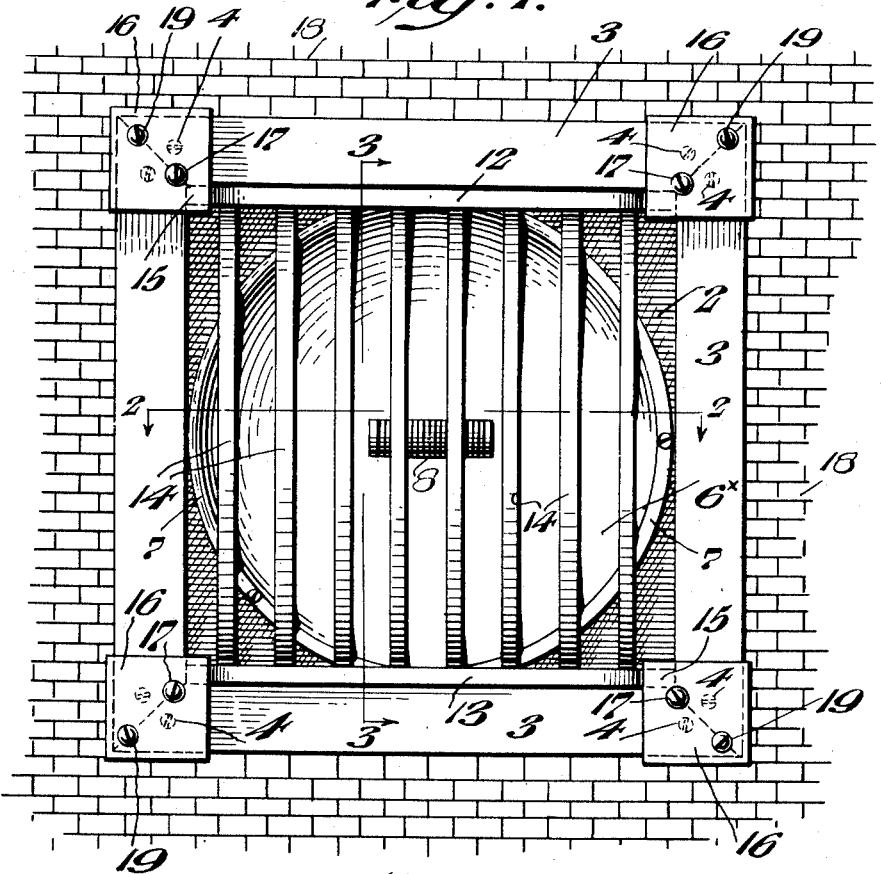
Fig. 1 is a face view of a wall having built therein an electric heater embodying the invention.
Figure 2:
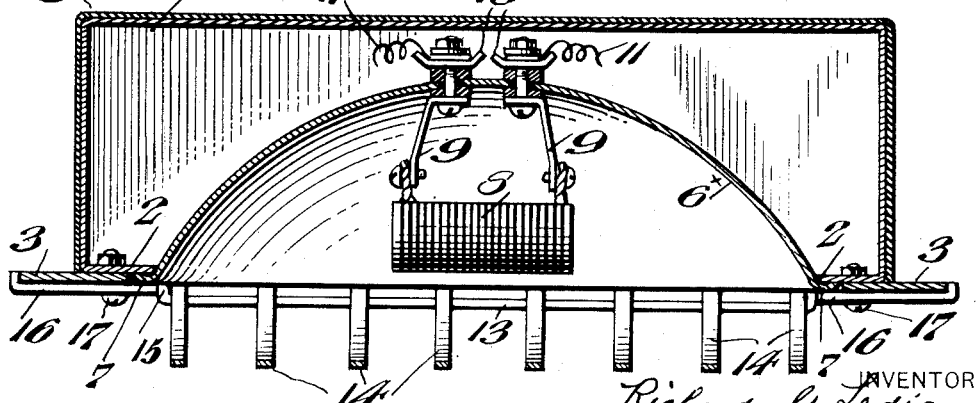
Fig. 2, is a view in horizontal section taken upon the lines 2—2 of Fig. 1.

Referring now to the drawings in detail, the reference numeral 1 designates a supporting structure preferably of thin metal which structure is of box-like form the front of which is open and is provided with flanged parts 2 to form means to receive facing strips 3 of which there are four. The strips 3 have bevelled ends, as clearly shown in Fig. 5, so as to be fitted together to provide a front frame as clearly seen in Fig. 1. Each of these facing strips 3 is secured to the flanged portion 2 of the main structure 1 by means of screws 4, see Fig. 5. The supporting structure 1 is exteriorly covered by a cover of insulating material 5, as for instance asbestos. The bottom of supporting structure 1 is provided with an inlet connection 6 in order to permit electrical wires to pass up into the supporting structure 1 for electrical attachment to the heating element. Arranged within the supporting structure 1 is a reflector 6ˣ the outer edge of which is provided with a bead 7 which abuts against flange portion 2 of structure 1 and the reflector is secured to said supporting structure 1 by means of the corner pieces 16 which overlap the annular bead of the reflector and which are hereinafter referred to. Centered with respect to and carried by reflector 6ˣ is a heating element 8 which may be of any desired type such as shown in Figs. 2 and 3 and which is carried by brackets 9 bolted to the said reflector and provided with terminals 10 which are adapted to be electrically connected as by leads 11 with a source of electrical current not shown in the drawings. Arranged within the confines of the frame as formed by strips 3 is a grille comprised of horizontal top and bottom pieces 12 and 13 and vertical pieces 14 the latter being extended outwardly upon curved lines, as best seen in Figs. 3 and 4. The extremities of each of the strips 12—13 comprise a lip 15 adapted to rest behind and be secured with respect to the front of the heater by means of rectangular corner pieces 16. The corner pieces are secured to the strips 3 by means of screws 17. Obviously, even a person unskilled with electric heater construction can conveniently detach the grille, the importance of which is readily apparent. In practice an electric heater as above described is built into the wall of the room to be heated, as best seen in Fig. 1, the reference numeral 18 designating the wall. The supporting structure 1 with its covering of asbestos 5 is fitted to an opening in the wall and in this connection it is to be noted that the strips 3 project from all four sides of the supporting structure and that the electrical heater positioned within the wall opening said projecting ends of the strips 3 abut against the outer face of wall 18 so as to provide a good finish. So positioned, screws 19 are employed which pass through the end plates into the wall 18 thus securely positioning the heater in permanent position. Further, it is to be noted that the conductors or leads 11 will in practice pass up through the wall so as to be concealed from view.

Referring now to Fig. 8, the heating element 20 is carried by brackets 21 which in turn are secured as by screws to a screw threaded plug 22 which in turn is fitted to a screw threaded socket 23 carried by reflector 6ˣ. Obviously, socket 23 and plug 22 are adapted to make electrical contact through connection 24 with leads 25.

In Fig. 9, the construction is the same as that shown in Fig. 8 except that plug 26 has attached directly thereto heating element 27 which projects from the plug and in concentric relation with the rim or bead 7 of reflector 6ˣ.

Having thus described my invention, what I claim as new and desire to secure by Letters Patent, is:

1. A built-in electric heater, comprising a casing adapted to be seated in a recess in a wall, marginal flanges for said casing adapted to abut against said wall, corner plates overlapping said flanges and adapted to be secured to said wall, a concave reflector secured in said casing, a heating element for said reflector, and a front grille for said casing comprising upper and lower bars having their ends secured between said corner plates and marginal flanges, and spaced vertical bars having their ends secured to said upper and lower horizontal bars.

2. A built-in electric heater, comprising a casing, an insulating covering therefor, said casing being adapted to seat in a recessed portion of a wall, marginal flanges for said casing adapted to abut against said wall, corner plates overlapping said flanges and adapted to be detachably secured to said wall, a concave reflector in said casing, a heating element within said reflector and a front grille for said casing comprising upper and lower horizontal bars having their ends secured between said corner plates and said marginal flanges, and spaced vertical, convexed bars secured to said upper and lower horizontal bars.

3. A built-in electric heater, comprising a polygonal casing, having inturned peripheral flanges, and an insulating covering, said casing being adapted to seat in a recessed portion of a wall, marginal flanges for said casing overlapping said inturned flanges and adapted to overlap said wall, fastening means passing through said inturned flanges and marginal flanges, corner plates overlapping said marginal flanges and being adapted to be secured to said wall, a concave reflector in said casing, a heating element within said reflector, and a front grille for said reflector comprising upper and lower horizontal flat bars having their ends detachably secured by said corner plates and spaced, vertical, convex bars secured to said upper and lower horizontal bars, said grille being removable from said casing as a unit.

In testimony whereof, I have hereunto signed my name.

RICH. G. LEDIG.